(12) United States Patent
Tanaka et al.

(10) Patent No.: US 12,188,768 B2
(45) Date of Patent: Jan. 7, 2025

(54) ANGLE DETECTOR AND POSITION MEASURING DEVICE

(71) Applicant: MITUTOYO CORPORATION, Kanagawa (JP)

(72) Inventors: Shunsuke Tanaka, Kanagawa (JP); Yoshiaki Kato, Kanagawa (JP); Miyako Mizutani, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 17/895,267

(22) Filed: Aug. 25, 2022

(65) Prior Publication Data
US 2023/0082750 A1 Mar. 16, 2023

(30) Foreign Application Priority Data
Sep. 16, 2021 (JP) .................. 2021-151153

(51) Int. Cl.
*G01B 7/30* (2006.01)
*G01B 11/26* (2006.01)
*G01D 5/20* (2006.01)

(52) U.S. Cl.
CPC ............... *G01B 7/30* (2013.01); *G01B 11/26* (2013.01); *G01D 5/20* (2013.01)

(58) Field of Classification Search
CPC ............ G01B 7/30; G01B 11/26; G01D 5/20
See application file for complete search history.

(56) References Cited

U.S. PATENT DOCUMENTS

| 4,764,767 A * | 8/1988 | Ichikawa | H03M 1/485 340/870.31 |
| 2002/0153479 A1* | 10/2002 | Kenjo | H03M 1/308 250/231.14 |
| 2011/0303831 A1* | 12/2011 | Nagura | G01D 5/3473 250/231.14 |
| 2012/0075622 A1* | 3/2012 | Nagura | G01D 5/3473 356/138 |
| 2012/0245876 A1 | 9/2012 | Watanabe | |

FOREIGN PATENT DOCUMENTS

| DE | 102005042616 | * 7/2010 |
| JP | 2003-262518 | 9/2003 |
| JP | 2006-098392 | 4/2006 |
| JP | 2011-099804 | 5/2011 |
| JP | 2016-118491 | 6/2016 |
| JP | 2019/039344 | 2/2019 |

OTHER PUBLICATIONS

Tadashi Masuda et al., "Automatic Calibration System for Angular Encoders", J-STAGE, vol. 52, pp. 17-32-1738, Feb. 16, 2010, English translation included, 17 pages.
Nobuyuki Ishii, "Development of Ultra-high precision Rotary Encoder using Virtual Equal Division Average Method", 2019, partial English translation included, 91 page.

* cited by examiner

*Primary Examiner* — Reena Aurora
(74) *Attorney, Agent, or Firm* — Rankin, Hill & Clark LLP

(57) ABSTRACT

An angle detector includes a rotary scale having a scale pattern in which a plurality of patterns are arrayed along a circumference direction of the rotary scale, and a plurality of detection heads, each of which detects the plurality of patterns from the scale pattern. The plurality of detection heads are shifted from each other in the circumference direction of the rotary scale and are shifted from each other in a radial direction of the rotary scale.

11 Claims, 7 Drawing Sheets

ANGLE DETECTOR AND POSITION MEASURING DEVICE

CROSS-REFERENCE TO RELATED APPLICATION

This application is based upon and claims the benefit of priority of the prior Japanese Patent Application No. 2021-151153 filed on Sep. 16, 2021, the entire contents of which are incorporated herein by reference.

FIELD

A certain aspect of embodiments described herein relates to An angle detector and a position measuring device.

BACKGROUND

Conventionally, in order to detect an angle with high accuracy, various proposals for detecting a high order error in an angle detector such as a rotary encoder have been made (for example, see Japanese Patent Application Publication No. 2003-262518 hereinafter referred to as Patent Document 1 and Japanese Patent Application Publication No. 2006-098392 hereinafter referred to as Patent Document 2). In Patent Document 1 and Patent Document 2, a plurality of detection heads are arranged so as to be offset in a circumferential direction on the same circumference, which enables detection of higher order errors in the angle detector.

SUMMARY

In one aspect of the present invention, it is an object to provide an angle detector and a position measuring device that can detect an angle with high accuracy without high order errors and can be downsized.

According to an aspect of the present invention, there is provided an angle detector including: a rotary scale having a scale pattern in which a plurality of patterns are arrayed along a circumference direction of the rotary scale; and a plurality of detection heads, each of which detects the plurality of patterns from the scale pattern, wherein the plurality of detection heads are shifted from each other in the circumference direction of the rotary scale and are shifted from each other in a radial direction of the rotary scale.

According to another aspect of the present invention, there is provided a position measuring device including: an angle detector comprising a rotary scale having a scale pattern in which a plurality of patterns are arrayed along a circumference direction of the rotary scale, and a plurality of detection heads, each of which detects the plurality of patterns from the scale pattern, wherein the plurality of detection heads are shifted from each other in the circumference direction of the rotary scale and are shifted from each other in a radial direction of the rotary scale; and a calculator configured to calculate a measurement error on a basis of angle detection values of the plurality of detection heads.

DESCRIPTION OF EMBODIMENTS

Recently, angle detectors are required not only to have high-accuracy angle detection performance but also to reduce the size of the angle detector itself. However, when trying to miniaturize the angle detector disclosed in Patent Document 1 or Patent Document 2, the detection heads may be arranged densely and the detection heads may interfere with each other. Therefore, there is a limit to the miniaturization of the angle detector disclosed in Patent Document 1 and Patent Document 2, and there is room for improvement in this respect.

Hereinafter, embodiments will be described with reference to the drawings.

Figure 1:
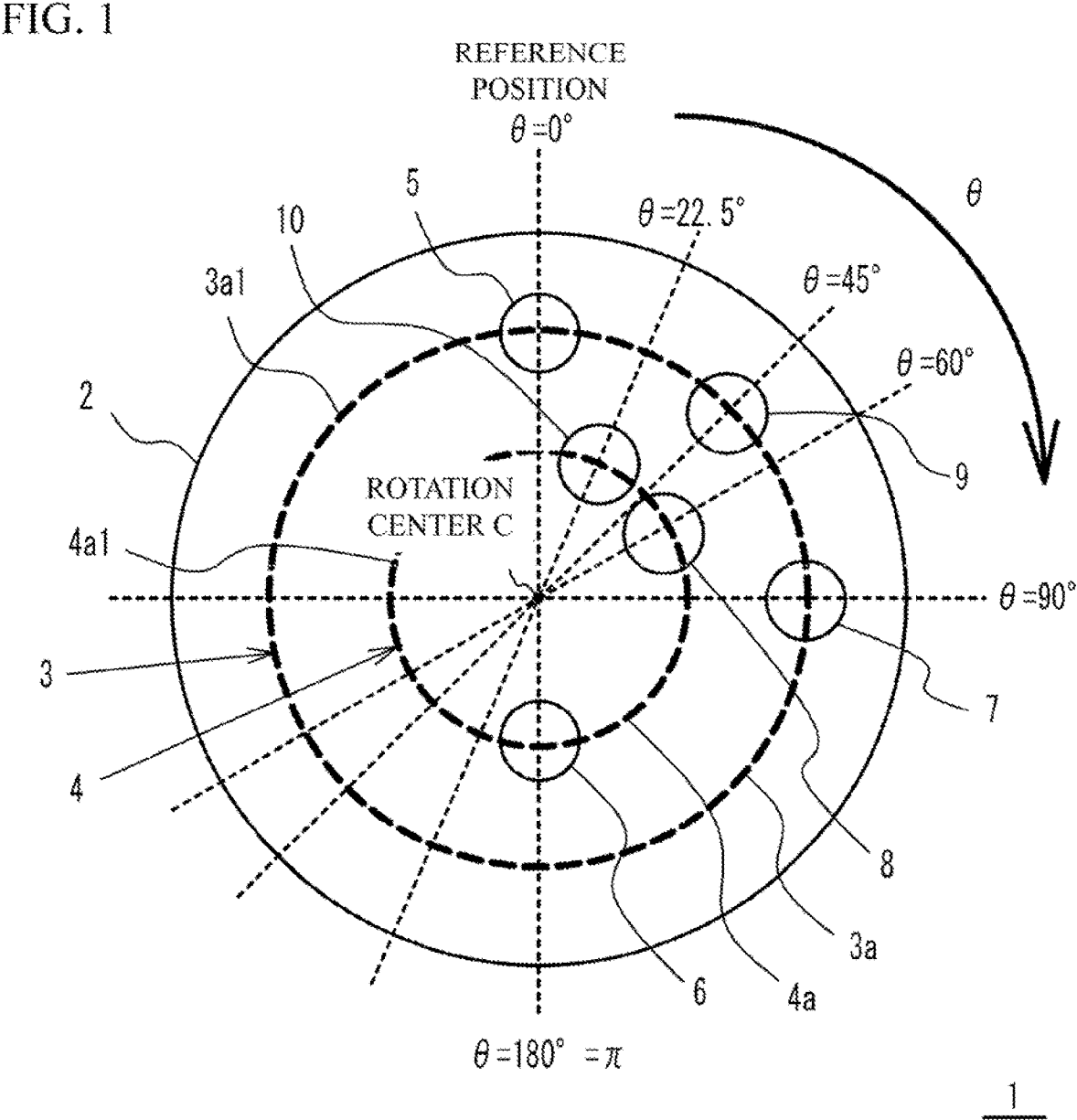
FIG. 1 is a schematic diagram illustrating a schematic configuration of an angle detector according to a first embodiment.
Figure 2:
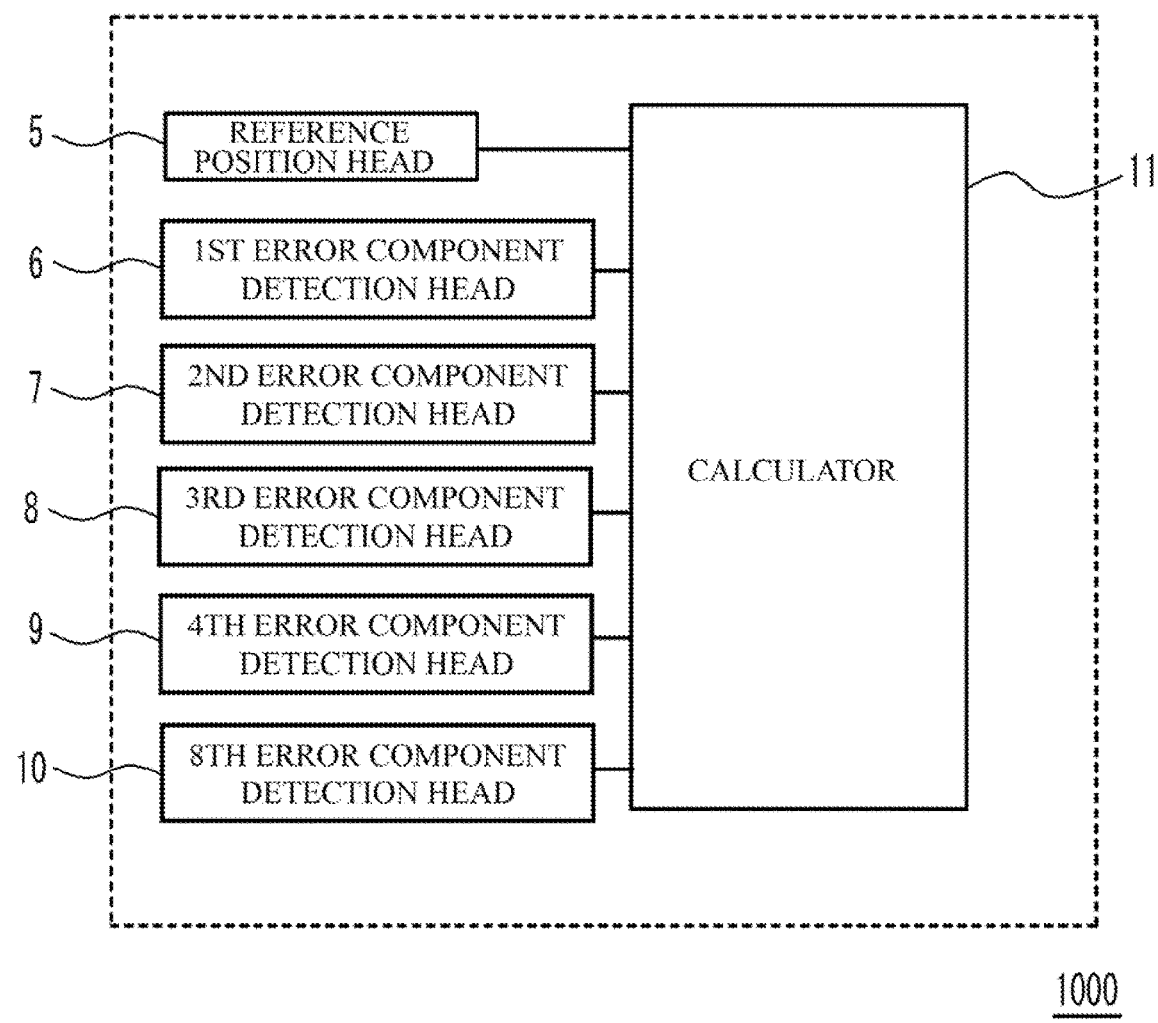
FIG. 2 is a block diagram illustrating s configuration of s position detection device according to a first embodiment.
Figure 3:
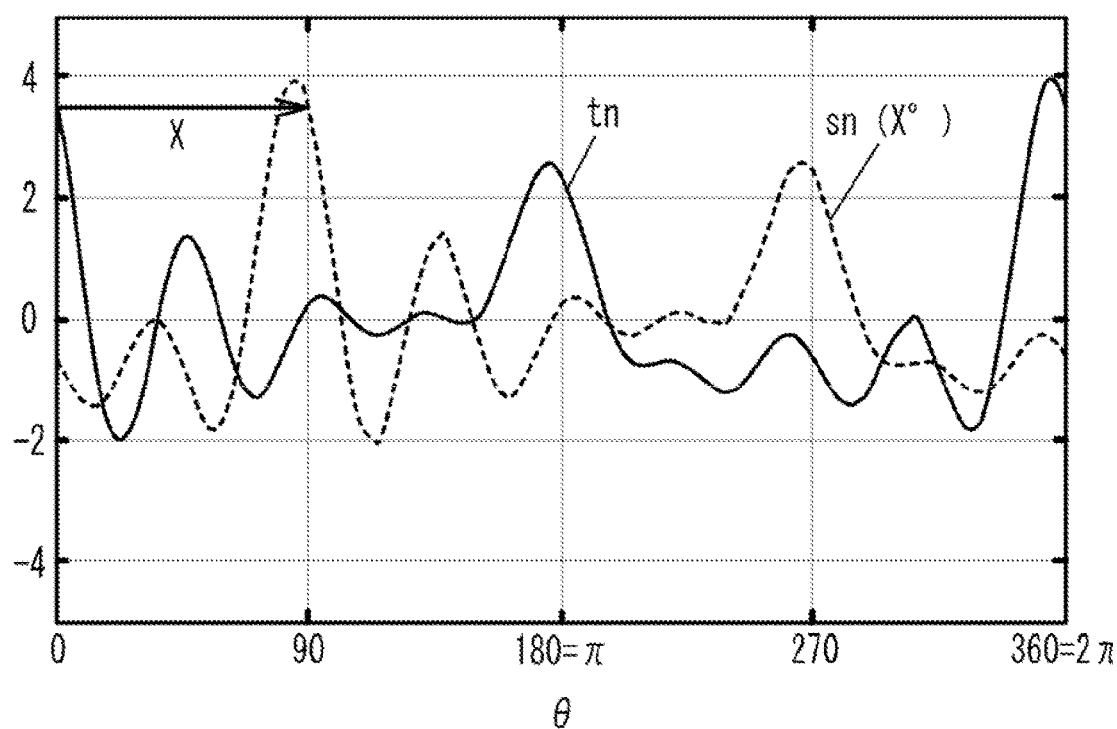
FIG. 3 illustrates a graph of a transition of a difference tn between an angle detection value of a reference detection head and an angle detection value detected by an n-th order error component detection head in a first embodiment, and a transition of a shift value obtained by shifting thr difference tn by X° along a circumferential direction.
Figure 4:
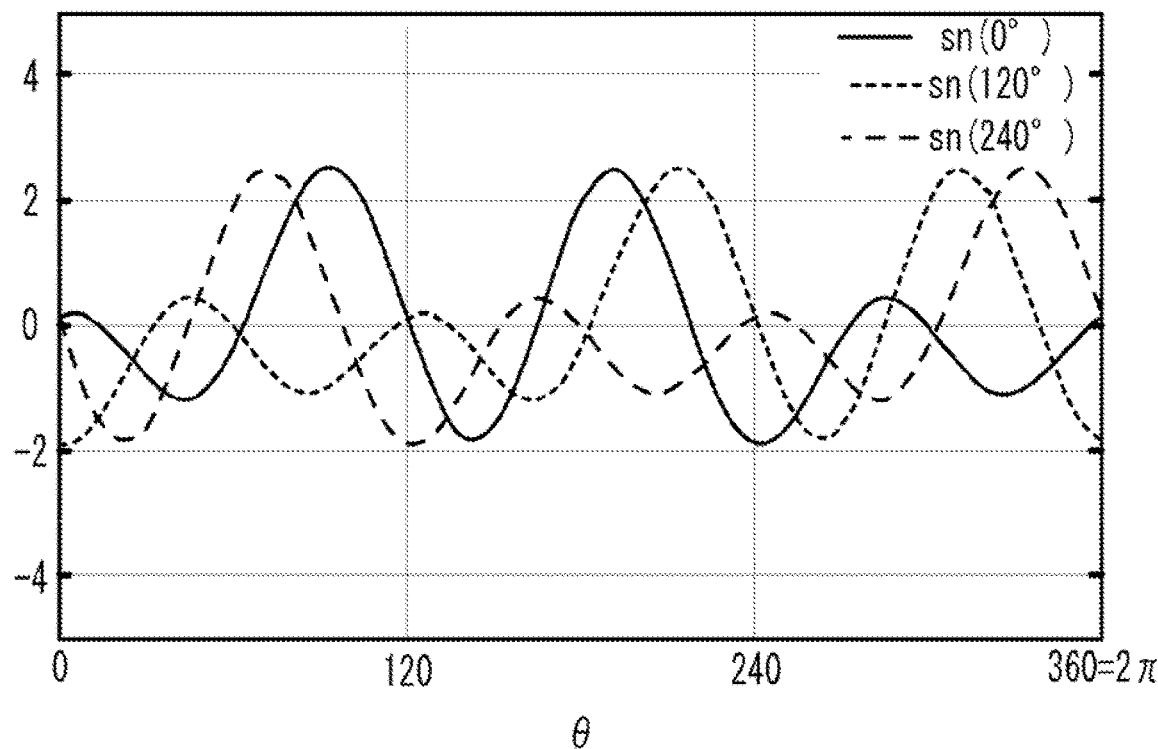
FIG. 4 illustrates a graph of a transition of a difference t3 (=sn (0°)) between an angle detection value of a reference detection head and an angle detection value detected by a third order error component detection head in a first embodiment, a transition of a shift value sn (120°) in which a difference tn is shifted by 120° along a circumferential direction, and a transition of a shift value (240°) in which the difference tn is shifted by 240° along the circumferential direction.
Figure 5:
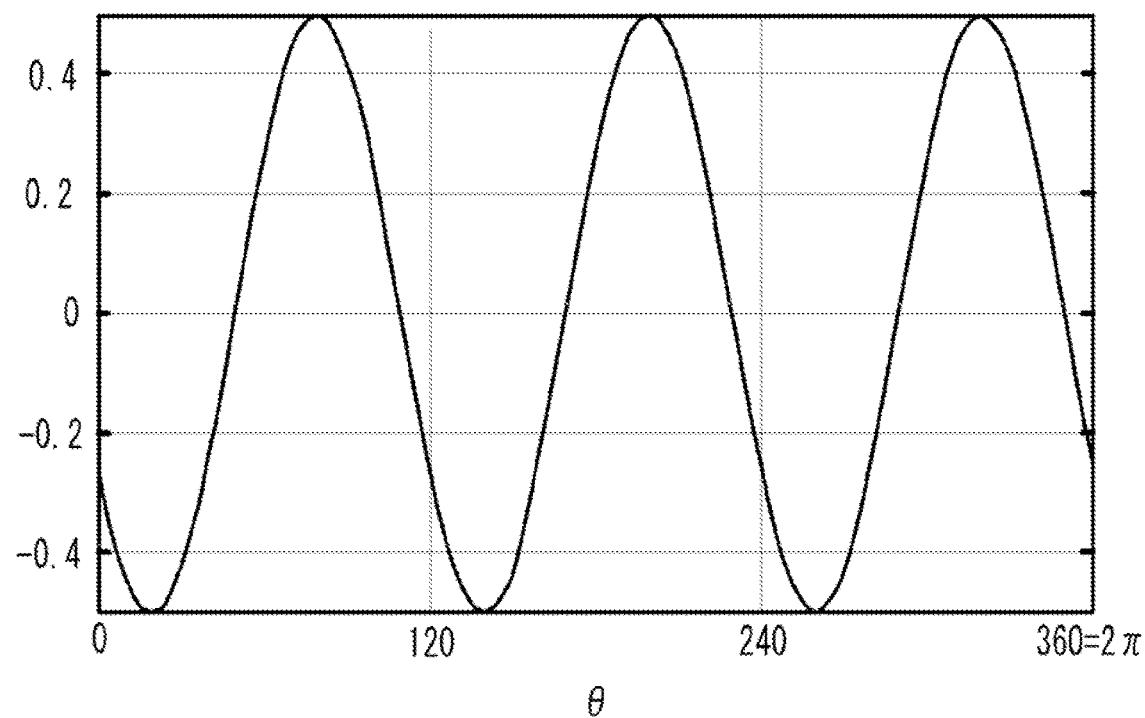
FIG. 5 is a graph illustrating a third order error component in a first embodiment.

(First Embodiment) First, an angle detector 1 of the first embodiment and the position detection device 1000 equipped with the angle detector 1 will be described with reference to FIG. 1 to FIG. 5. FIG. 1 is a schematic diagram illustrating a schematic configuration of the angle detector 1 according to the first embodiment. FIG. 2 is a block diagram illustrating the configuration of the position detection device 1000 according to the first embodiment. FIG. 3 illustrates a graph of a transition of a difference tn between the angle detection value of the reference detection head and the angle detection value detected by the n-th order error component detection head in the first embodiment, and a transition of a shift value obtained by shifting the difference tn by X° along the circumferential direction. FIG. 4 illustrates a graph of a transition of the difference t3 (=sn (0°)) between the angle detection value of the reference detection head 5 and the angle detection value detected by the third order error component detection head 8 in the first embodiment, a transition of a shift value sn (120°) in which the difference tn is shifted by 120° along the circumferential direction, and a transition of the shift value (240°) in which the difference tn is shifted by 240° along the circumferential direction. FIG. 5 is a graph illustrating a third order error component in the first embodiment.

Referring to FIG. 1, the angle detector 1 of the first embodiment forms an electromagnetic induction type rotary encoder. The angle detector 1 includes a rotary scale 2, the reference detection head 5, a first order error component detection head 6, a second order error component detection head 7, a third order error component detection head 8, a fourth order error component detection head 9, and an eighth order error component detection head 10. Further, referring to FIG. 2, the position detection device 1000 includes a calculator 11. The reference detection head 5, the first order error component detection head 6, the second order error component detection head 7, the third order error component detection head 8, the fourth order error component detection head 9, and the eighth order error component detection head 10 are electrically connected to the calculator 11. A detection signal is input to the calculator 11 from these detection heads. The angle detector 1 may be a photoelectric encoder.

The angle detector 1 of the first embodiment subtracts a high order error component based on the angle detection value detected by each n-th order error component detection heads 6 to 10 from the angle detection value detected by the reference detection head 5. This enables highly accurate angle detection.

FIG. 1 does not illustrate actual sizes of the reference detection head 5, the first order error component detection head 6, the second order error component detection head 7, the third order error component detection head 8, the fourth order error component detection head 9, and the eighth order error component detection head 10. That is, FIG. 1 illustrates the positional relationship between these detection heads with respect to the rotary scale 2 and the positional relationship between the detection heads, and does not exactly illustrate the distance between the detection heads, the dimensions of each detection head, and the dimensions of the rotary scale 2.

The rotary scale 2 is a disk-shaped member, and is mounted on an object by aligning the rotation axis of the object for angle detection (not shown) with the rotation center C. The rotary scale 2 includes a first track 3 and a second track 4. The first track 3 has a scale pattern 3a including a plurality of patterns 3a1 arranged along the circumferential direction of the rotary scale 2. The second track 4 has a scale pattern 4a including a plurality of patterns 4a1 arranged along the circumferential direction of the rotary scale 2. The first track 3 and the second track 4 are both provided in a circular shape, but the diameter of the first track 3 is larger than the diameter of the second track 4. That is, the second track 4 is provided inside the first track 3 in the circumferential direction, whereby the first track 3 and the second track 4 are installed so as to be displaced in the radial direction. Although FIG. 1 illustrates the positional relationship between the first track 3 and the second track 4, it does not accurately represent the distance between the two tracks.

As illustrated in FIG. 1, when the position of $\theta=0°$ is set as the reference position, the reference detection head 5 is installed in accordance with this reference position. The reference detection head 5 is installed so that $\theta=0°$ and the first track 3 is aligned with the reference detection head 5.

The first order error component detection head 6 to the eighth order error component detection head 10 are installed at a position rotated ($360°/2n$) when n represents the order of the error component. Further, the reference detection head 5 and the first order error component detection head 6 to the eighth order error component detection head 10 are installed so that the detection heads adjacent to each other in the circumferential direction are divided into the first track 3 and the second track 4.

The first order error component detection head 6 is installed at $\theta=180°$ and in line with the second track 4. The second order error component detection head 7 is installed at $\theta=90°$ and in line with the first track 3. The third order error component detection head 8 is installed at $\theta=60°$ and in line with the second track 4. The fourth order error component detection head 9 is installed at $\theta=45°$ and in line with the first track 3. The eighth order error component detection head 10 is installed at $\theta=22.5°$ and in line with the second track 4.

The eighth order error component detection head 10 is installed in line with the second track 4, because the reference detection head 5 adjacent to the eighth order error component detection head 10 in the circumferential direction is installed in the first track 3. The fourth order error component detection head 9 is installed in line with the first track 3, because the eighth order error component detection head 10 adjacent to the fourth order error component detection head 9 in the circumferential direction is installed in the second track 4. The third order error component detection head 8 is installed in line with the second track 4, because the fourth order error component detection head 9 adjacent to the third order error component detection head 8 in the circumferential direction is installed in the first track 3. The second order error component detection head 7 is installed in line with the first track 3, because the third order error component detection head 8 adjacent to the second order error component detection head 7 in the circumferential direction is installed in the second track 4. The first order error component detection head 6 is installed in line with the second track 4, because the secondary error component detection head 7 adjacent to the first order error component detection head 6 in the circumferential direction is installed in the first track 3.

In this way, by allocating and installing the detection heads adjacent to each other in the circumferential direction to the first track 3 and the second track 4, it is possible to avoid interference between the detection heads. That is, since the detection heads can be installed close to each other, the angle detector 1 can be downsized. In particular, five detection heads are installed between $\theta=60°$ and $\theta=90°$. If these detection heads are installed on one circumference, the circumferential distance required for installation becomes long, and it becomes difficult to reduce the size of the angle detector 1. On the other hand, by arranging the detection heads in a radial direction as in the first embodiment, it is possible to avoid interference between the detection heads.

Here, an example of the angle detection method by the position detection device 1000 of the first embodiment will be described. First, the policy of the angle detection method in the first embodiment will be described. This policy is consistent with the processing performed by the angle detector disclosed in Japanese Patent Application Publication No. 2003-262518. In order to detect the angle by the position detection device 1000, first, (1) the angle detection value is acquired for each n-th order error component detection head in advance, and each higher order error component is obtained based on this. Then, (2) each of these higher order error components is subtracted from the angle detection value acquired by the reference detection head 5. Hereinafter, the angle detection method will be described according to this policy. In addition, the calculation such as subtraction is executed by the calculator 11.

First, the acquisition of the n-th order higher order error component will be described. The difference tn between the angle detection value acquired by the reference detection head 5 installed at the angle $\theta=0°$ and the angle detection value acquired by the n-th order error component detection heads 6 to 10 installed at the angle $\theta=360°/2$ is calculated in order to obtain the n-th order higher order error component. Here, assuming that the angle detection value detected by the detection head installed at the angle θ is expressed as GS (θ), the angle detection value detected by the reference detection head 5 is expressed as GS (0°). Similarly, the angle detection value detected by the n-th order error component detection head is expressed as GS (360°/2n).

[Equation 1]

$$t_n = GS(0°) - GS\left(\frac{360°}{2n}\right) \quad (1)$$

Then, the difference nt represented by the equation (1) is obtained over one round. Here, the value obtained by shifting the difference tn from θ=0° by an angle X° is defined as the shift value sn (X°). An example of the shift value sn (X°) is illustrated in the graph of FIG. 3.

The sum of the shift values sn (X°) defined in this way is the total value Gn of the n-th order error component. That is, the total value Gn can be obtained by the following equation (2).

[Equation 2]

$$G_n = \frac{1}{2n}\sum_{k=0}^{n-1}s_n\left(\frac{360°}{n}\cdot k\right) \quad (2)$$

By calculating the total value Gn for each n-th order error component using the equation (2) and subtracting them from the angle detection value acquired by the reference detection head 5, highly accurate angle detection without higher order errors can be performed. In the equation (2), k is an integer satisfying 0≤k<n.

Here, in order to show an example of calculation of the n-th order higher order error component, the calculation of n=3, that is, the total value G3 of the third order error component will be described.

In order to calculate the total value G3 of the third order error components, first, the difference t3 is calculated using the following equation (3). The difference t3 is a difference between the angle detection value GS (0°) of the reference detection head 5 installed at the position of θ=0° and the angle detection value GS (60°) of the third order error component detection head 8 installed at the position of θ=60°. θ=60° can be obtained by substituting n=3 for (360°/2n).

[Equation 3]

$$t_3 = GS(0°) - GS(60°) \quad (3)$$

Next, the difference t3 represented by the equation (3) is obtained over one round. Here, the shift value sn (0°) obtained by shifting the difference t3 by 0°, the shift value sn (120°) obtained by shifting the difference t3 by 120°, and the shift value sn (240°) obtained by shifting the difference t3 by 240° are obtained. The shift value sn (0°) is the value when k=0 in the equation (2). The shift value sn (120°) is the value when k=1 in the equation (2). The shift value sn (240°) is the value when k=2 in the equation (2). Since the shift value sn (0°) is a value in which the difference t3 is not shifted at all, the shift value sn (0°) is the difference t3 itself.

The shift value sn (0°), the shift value sn (120°) and the shift value sn (240°) can be drawn as illustrated in the graph of FIG. 4. By summing these shift values using the equation (4), the total value G3 of the third order error components drawn in the graph of FIG. 5 can be obtained.

[Equation 4]

$$G_3 = \frac{1}{2\cdot 3}\sum_{k=0}^{3-1}s_n(120°\cdot k) \quad (4)$$

The n-th order error component other than the third order error component can be calculated in the same manner. The calculator 11 subtracts each total value Gn calculated in this way from the angle detection value acquired by the reference detection head 5 to obtain the finally detected angle value.

In the angle detector 1 of the first embodiment, since a plurality of detection heads are installed so as to be offset along the circumferential direction of the rotary scale 2, high order error is eliminated and highly accurate angle detection is possible. Further, since the plurality of detection heads are arranged so as to be offset in the radial direction of the rotary scale 2, the angle detector 1 can be downsized.

The angle detector 1 of the first embodiment has the reference detection head 5, and the n-th order error component detection heads installed at the positions which are rotated (360°/2n) with respect to the reference position when the reference position where the reference detection heat 5 is located is 0°. This enables highly accurate angle detection without high order errors.

According to the angle detector 1 of the first embodiment, the rotary scale 2 includes a plurality of tracks arranged so as to be displaced in the radial direction, and the plurality of detection heads are arranged corresponding to the plurality of tracks. Therefore, the angle detector 1 can be downsized.

Further, the angle detector 1 of the first embodiment has the first track 3 and the second track 4 provided on the inner side of the first track 3 in the circumferential direction. And the detection heads adjacent to each other in the circumference direction are divided into the first track 3 and the second track 4. As a result, interference between the detection heads can be avoided, and the angle detector 1 can be downsized.

Figure 6:
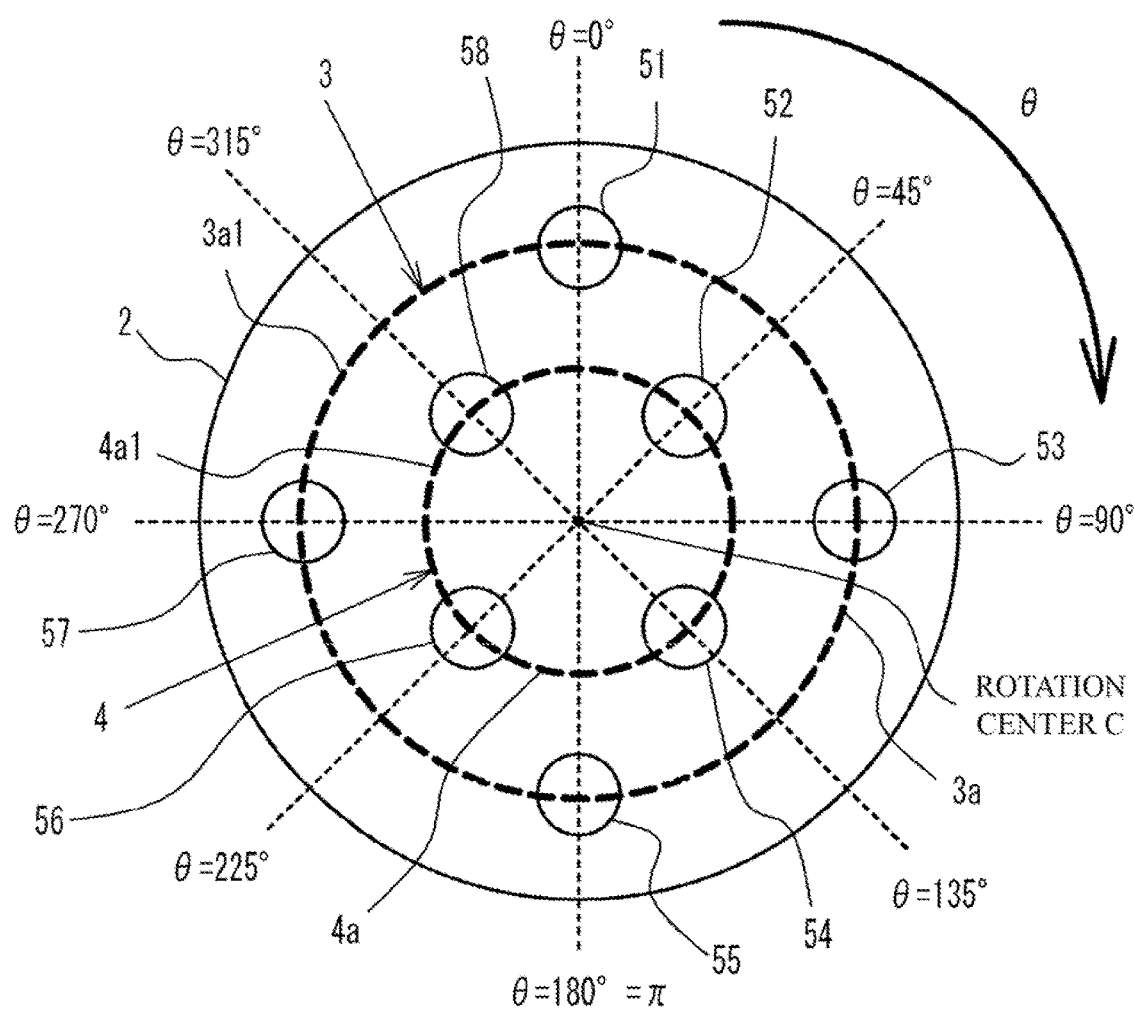
FIG. 6 is a schematic diagram showing a schematic configuration of an angle detector according to a second embodiment.

(Second Embodiment) Next, an angle detector 50 of the second embodiment will be described with reference to FIG. 6. FIG. 6 is a schematic diagram showing a schematic configuration of the angle detector 50 according to the second embodiment.

Referring to FIG. 6, the angle detector 50 of the second embodiment forms an electromagnetic induction type rotary encoder. The angle detector 50 includes the rotary scale 2 and a first detection head 51 to an eighth detection head 58. Since the rotary scale 2 is the same as that adopted in the first embodiment, detailed description thereof will be omitted here.

The first detection head 51 to the eighth detection head 58 are provided in place of the reference detection head 5 and the first order error component detection head 6 to the eighth order error component detection head 10 in the first embodiment. Therefore, the first detection head 51 to the eighth detection head 58 are electrically connected with the calculator 11 (FIG. 2), similarly to the reference detection head 5 and the first order error component detection head 6 to the eighth order error component detection head 10 in the first embodiment. A detection signal is input to the calculator 11 from these detection heads. The angle detector 1 may be a photoelectric encoder.

The first detection head 51 to the eighth detection head 58 are installed so as to maintain an interval which is obtained by dividing the entire circumference of the rotary scale 2 by N=8 along the circumferential direction. Specifically, the first detection head 51 is at the position of θ=0°. The second detection head 52 is at the position of θ=45°. The third detection head 53 is at the position of θ=90°. The fourth detection head 54 is at the position of θ=135°. Further, the fifth detection head 55 is at the position of θ=180°. The sixth detection head 56 is at the position of θ=225°. The seventh detection head 57 is at the position of θ=270°. The eighth detection head 58 is at the position of θ=315°.

The first detection head 51 to the eighth detection head 58 are installed so as to be offset in the radial direction of the rotary scale 2. Specifically, the first detection head 51 to the eighth detection head 58 are installed by dividing the detection heads adjacent to each other in the circumferential direction into the first track 3 and the second track 4. That is, among the first detection head 51 to the eighth detection head 58, the first detection head 51, the third detection head 53, the fifth detection head 55, and the seventh detection head 57 are installed in accordance with the first track 3. The second detection head 52, the fourth detection head 54, the sixth detection head 56, and the eighth detection head 58 are installed in accordance with the second track 4.

In this way, by allocating and installing the detection heads adjacent to each other in the circumferential direction to the first track 3 and the second track 4, it is possible to avoid interference between the detection heads. That is, since the detection heads can be installed close to each other, the angle detector 50 can be downsized.

Here, an example of the relationship between the dimensions of each detection head and the dimensions of the rotary scale 2 will be described. It is assumed that the dimension of each detection head along the circumferential direction of the rotary scale 2 is about 40 mm. Then, it is assumed that the diameter of the rotary scale 2 is 60 mm. In this case, since the circumferential length of the rotary scale is 60 πmm. When a plurality of detection heads are to be installed on one circumference, the number of detection heads is limited to four, and five or more detection heads cannot be used. On the other hand, when a plurality of detection heads are installed so as to be displaced in the radial direction of the rotary scale 2 as in the present embodiment, there is room for installing five or more detection heads. By providing a margin for installing the detection head in this way, the angle detector 50 can be downsized.

In the second embodiment, eight detection heads are installed. However, by installing these detection heads so as to be offset in the radial direction of the rotary scale 2, the angles of the detection heads are maintained while maintaining the alignment in the circumferential direction and the angle detector 50 can be downsized. In the angle detector 50 of the second embodiment, the detection heads are installed while maintaining the interval in which 360° (=2π) is divided into 8 equal parts by setting N=8. However, the number of equal divisions is not limited. N may be a natural number other than 1.

In this way, when a plurality of detection heads are installed while maintaining an interval divided into N equal parts in the circumferential direction on the entire circumference of the rotary scale 2, angle detection can be performed using the "equal division averaging method". The "equal division averaging method" is a method used when performing angle detection with high accuracy using a plurality of detection heads. In the "equal division averaging method", the second embodiment also follows the basic policy thereof. Hereinafter, an example of angle detection in the second embodiment will be described. In the following description, θ=0° will be set as a reference position for description.

Here, assuming that the detection heads installed at the positions where 2π is divided into N equal parts are numbered as k=0, 1, ..., N−1, and the angle detection value of each detection head is $L_k$, the obtained angle detection value M obtained by using the equal division averaging method is represented by the general formula (5). In the present embodiment, the first detection head 51 is installed according to the reference position θ=0°, and the first detection head 51 corresponds to the detection head with k=0. Then, the second detection head 52 corresponds to the detection head with k=1. And the corresponding relationship is set for the detection heads of the third detection head 53 and below in the same manner.

[Equation 5]

$$M = \frac{1}{N}\sum_{k=0}^{N-1} L_k \quad (5)$$

Highly accurate angle detection can be performed by performing the calculation using the equation (5). However, here, the reason why the highly accurate angle detection can be performed by using the equation (5) will be explained by generalizing the angle detection value and the like.

Generally, the detection value H (θ) of the detection head at the position θ with respect to the reference position of the rotary encoder is expressed by the following equation (6).

[Equation 6]

$$H(\theta) = \theta + \varepsilon(\theta) \quad (6)$$

In the equation (6), θ is an angular position represented in the range of 0 to 2π from the reference position, and ε(θ) is an error term. The detection heads in which 2π is arranged at N equal division positions are numbered as k=0, 1, ..., N−1, respectively. Assuming that θ=0° where the 0-th detection head is installed is the reference position, the phase of the error term shifts by 2πk/N in the k-th detection head, so the detection values $H_{n,k}$ (θ) are expressed by the following equation (7).

[Equation 7]

$$H_{N,k}(\theta) = \theta + \varepsilon(\theta + 2\pi k/N) \quad (7)$$

With the rotary encoder, the error term becomes a closed periodic curve because the rotary encoder returns to the original position after one rotation. Therefore, the error term is expressed by the following equation (8).

[Equation 8]

$$\varepsilon(\theta) = \sum_{n=1}^{\infty} C_n \cdot \sin(n\theta + \alpha_n) \quad (8)$$

In the equation (8), $C_n$ is the amplitude of the n-th order component of the error, and $\alpha_n$ is the phase shift of the n-th order component of the error.

Here, considering the average value $A_{N,k}$ (θ) of the angle detection values of the N detection heads, the average value $A_{N,k}$ (θ) can be expressed as the following equation (9).

[Equation 9]

$$A_{n,k}(\theta) = \frac{1}{N} \cdot \sum_{k=0}^{N-1} H_{N,k}(\theta) \qquad (9)$$

Then, by rearranging this equation (9), the following equation (10) can be obtained.

[Equation 10]

$$A_{n,k}(\theta) = \theta + \frac{1}{N} \sum_{k=0}^{N-1} \varepsilon\left(\theta + \frac{2\pi k}{N}\right) \qquad (10)$$

Further, by substituting the equation (8) relating to ε into the equation (10), the following equation (11) can be obtained.

[Equation 11]

$$A_{n,k}(\theta) = \theta + \frac{1}{N} \sum_{k=0}^{N-1} \sum_{n=1}^{\infty} C_n \cdot \sin\left(n\left(\theta + \frac{2\pi k}{N}\right) + \alpha_n\right) \qquad (11)$$

Here, When j is an arbitrary natural number, the following equations (12) and (13) are satisfied.
When n=jN,

[Equation 12]

$$\frac{1}{N} \sum_{k=0}^{N-1} C_n \cdot \sin\left(n\left(\theta + \frac{2\pi k}{N}\right) + \alpha_n\right) = C_n \cdot \sin(n\theta + \alpha_n) \qquad (12)$$

When n≠jN

[Equation 13]

$$\frac{1}{N} \sum_{k=0}^{N-1} C_n \cdot \sin\left(n\left(\theta + \frac{2\pi k}{N}\right) + \alpha_n\right) = 0 \qquad (13)$$

In the equations (12) and (13), only an error of an order of a multiple of N remains in the average value $A_{N,k}(\theta)$ of the angle detection values of the detection heads arranged at equal intervals, and the other components are 0.

Therefore, when eight detection heads are installed at equal intervals as in the second embodiment and the equal interval averaging method is used, the remaining error components are 8th, 16th, 24th, and so on. That is, the following errors can be eliminated, such as (1 to 7)-th order, (9 to 15)-th order, (17 to 23)-th order, and so on. And as a result, angle detection can be performed with high accuracy.

In the angle detector 50 of the second embodiment, since the plurality of detection heads are installed so as to be offset along the circumferential direction of the rotary scale 2, high order error can be removed and highly accurate angle detection is possible. Further, since the plurality of detection heads are arranged so as to be offset in the radial direction of the rotary scale 2, the angle detector 1 can be downsized.

The angle detector 50 of the second embodiment includes the plurality of detection heads installed so as to maintain an interval of N equal divisions along the circumferential direction of the entire circumference of the rotary scale 2. As a result, angle detection can be performed with high accuracy using the equal division averaging method.

According to the angle detector 50 of the second embodiment, the rotary scale 2 includes the plurality of tracks arranged so as to be displaced in the radial direction. And the plurality of detection heads are arranged corresponding to the plurality of tracks. Therefore, the angle detector 50 can be downsized.

Further, the angle detector 50 of the second embodiment has the first track 3 and the second track 4 provided on the inner side of the first track 3 in the circumferential direction. And the detection heads adjacent to each other in the circumferential direction are divided into the first track 3 and the second track 4. As a result, interference between the detection heads can be avoided. And the angle detector 50 can be downsized.

Figure 7:
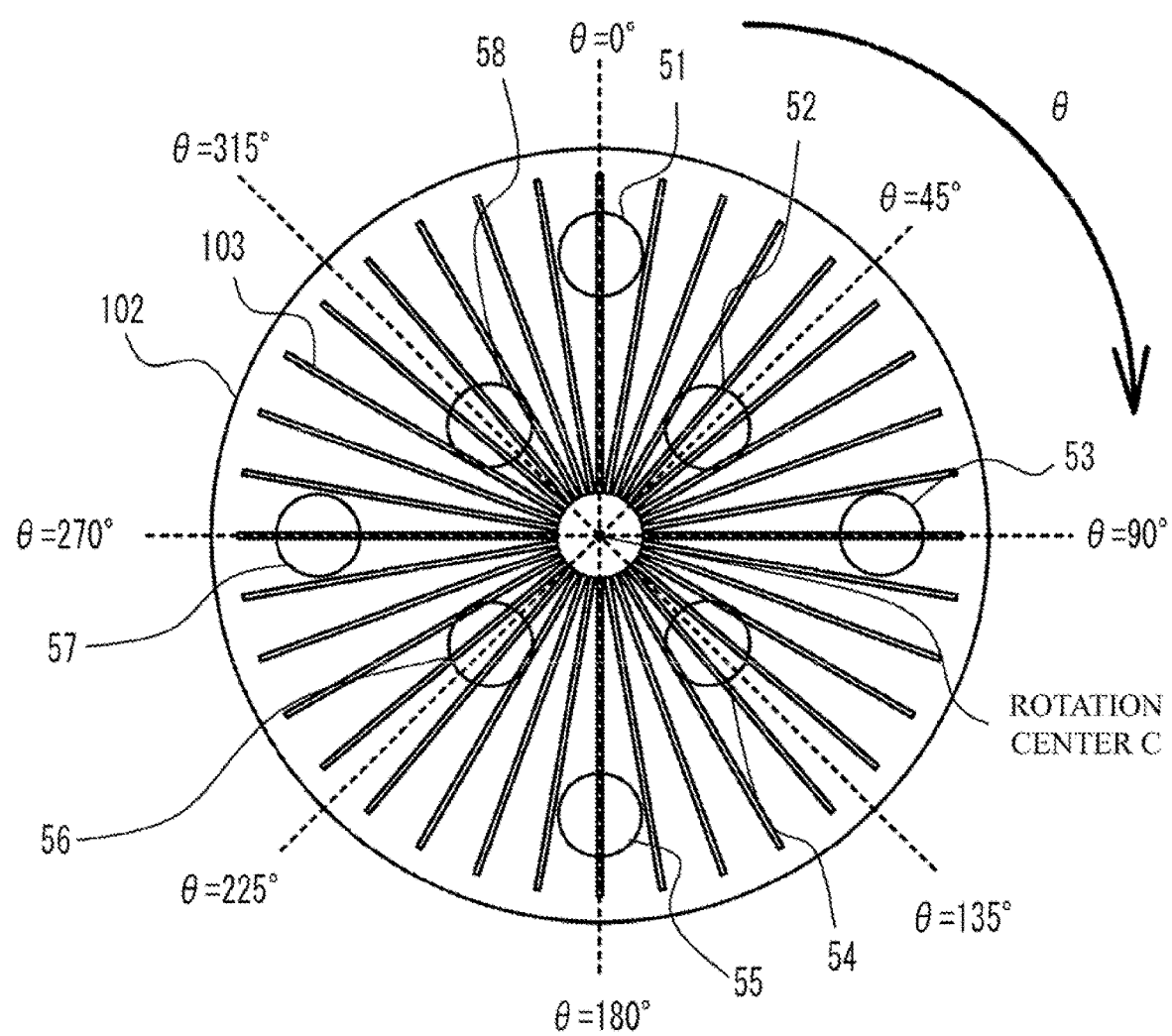
FIG. 7 is a schematic diagram illustrating a schematic configuration of an angle detector according to a third embodiment.

(Third Embodiment) Next, the angle detector 100 of the third embodiment will be described with reference to FIG. 7. FIG. 7 is a schematic diagram illustrating a schematic configuration of the angle detector 100 according to the third embodiment.

The angle detector 100 of the third embodiment includes a rotary scale 102 instead of the rotary scale 2 of the angle detector 50 of the second embodiment. Since the other points are the same as those of the angle detector 50 of the second embodiment, the same reference numbers are added to the common configuration in the drawings, and detailed description thereof will be omitted.

The rotary scale 102 includes a pattern 103 extending radially along its radial direction. That is, the rotary scale 102 includes the pattern 103 in place of the first track 3 and the second track 4 included in the rotary scale 2 in the first embodiment and the second embodiment.

Like the angle detector 50 of the second embodiment, the angle detector 100 has the first detection head 51 to the eighth detection heat 58 installed so as to maintain an interval of N=8 equally divided along the circumferential direction around the entire circumference of the rotary scale 102. Therefore, the angle detector 100 can perform angle detection with high accuracy by using the equal division averaging method, similarly to the angle detector 50. Further, since the first detection head 51 to the eighth detection head 58 are installed so as to be offset in the radial direction within the radial range of the rotary scale 102 provided with the pattern 103, the angle detector 100 can be downsized.

The angle detector 100 may employ the reference detection head 5 and the first order error component detection heads 6 to 8-th order error component detection head 10 in the first embodiment instead of the first detection head 51 to the eighth detection head 58. In this case, highly accurate angle detection can be performed as described in the first embodiment.

The present invention is not limited to the specifically disclosed embodiments and variations but may include other embodiments and variations without departing from the scope of the present invention.

What is claimed is:
1. An angle detector comprising:
   a rotary scale having a scale pattern in which a plurality of patterns are arrayed along a circumference direction of the rotary scale; and
   a plurality of detection heads, each of which detects the plurality of patterns from the scale pattern,
      wherein the plurality of detection heads are shifted from each other in the circumference direction of the rotary scale and are shifted from each other in a radial direction of the rotary scale, wherein the rotary scale has a plurality of tracks, each of which has a plurality of patterns arrayed along the circumference direction of the rotary scale and is shifted from each other in a radial direction of the rotary scale, and wherein at least two detection heads of said plurality of detection heads are arranged on each of the plurality of tracks, and in at least two of the plurality of tracks, a pair of the detection heads among the plurality of detection heads arranged on the same track are arranged opposite to each other with a 180° separation between them.

2. The angle detector as claimed in claim 1, wherein the plurality of detection heads include a reference head and n-th order error component detection heads which are installed at positions which are rotated by (360°/2n) from a reference position when the reference position is 0° where the reference detection head is arranged.

3. The angle detector as claimed in claim 1, wherein the plurality of detection heads are installed so as to maintain an interval obtained by dividing an entire circumference of the rotary scale by N along the circumference direction.

4. The angle detector as claimed in claim 1,
wherein the plurality of tracks include a first track and a second track which is provided on an inner side of the first track, and
wherein the plurality of detection heads are installed so that detection heads adjacent to each other in the circumference direction are divided into the first track and the second track.

5. The angle detector as claimed in claim 1, wherein the plurality of patterns radially extend along a radial direction of the rotary scale.

6. A position measuring device comprising:
an angle detector comprising a rotary scale having a scale pattern in which a plurality of patterns are arrayed along a circumference direction of the rotary scale, and a plurality of detection heads, each of which detects the plurality of patterns from the scale pattern, wherein the plurality of detection heads are shifted from each other in the circumference direction of the rotary scale and are shifted from each other in a radial direction of the rotary scale, wherein the rotary scale has a plurality of tracks, each of which has a plurality of patterns arrayed along the circumference direction of the rotary scale and is shifted from each other in a radial direction of the rotary scale, and
wherein at least two detection heads of said plurality of detection heads are arranged on each of the plurality of tracks, and in at least two of the plurality of tracks, a pair of the detection heads among the plurality of detection heads arranged on the same track are arranged opposite to each other with a 180° separation between them; and
a calculator configured to calculate a measurement error on a basis of angle detection values of the plurality of detection heads.

7. The position measuring device as claimed in claim 6, wherein the plurality of detection heads include a reference head and n-th order error component detection heads which are installed at positions which are rotated by (360°/2n) from a reference position when the reference position is 0° where the reference detection head is arranged, and wherein the calculator obtains a calculation value of an n-th order error component on a basis of an angle detection value detected by the n-th order error component detection heads, and obtains a corrected detection value by subtracting the calculation value from an angle detection value detected by the reference detection head.

8. The position measuring device as claimed in claim 6,
wherein the plurality of detection heads are installed so as to maintain an interval obtained by dividing an entire circumference of the rotary scale by N along the circumference direction, and
wherein the calculator calculates an average value of angle detection values detected by N number of detection heads and treats the average value as a corrected detection value.

9. The position measuring device as claimed in claim 6,
wherein the plurality of tracks include a first track and a second track which is provided on an inner side of the first track, and
wherein the plurality of detection heads are installed so that detection heads adjacent to each other in the circumference direction are divided into the first track and the second track.

10. The position measuring device as claimed in claim 6, wherein the plurality of patterns radially extend along a radial direction of the rotary scale.

11. An angle detector comprising:
a rotary scale having a scale pattern in which a plurality of patterns are arrayed along a circumference direction of the rotary scale; and
a plurality of detection heads, each of which detects the plurality of patterns from the scale pattern,
wherein the plurality of detection heads are shifted from each other in the circumference direction of the rotary scale and are shifted from each other in a radial direction of the rotary scale,
wherein the rotary scale has a plurality of tracks, each of which has a plurality of patterns arrayed along the circumference direction of the rotary scale and is shifted from each other in a radial direction of the rotary scale,
wherein at least two detection heads of said plurality of detection heads are arranged on each of the plurality of tracks,
wherein the plurality of detection heads include a reference head and n-th order error component detection heads which are installed at positions which are rotated by (360°/2n) from a reference position when the reference position is 0° where the reference detection head is arranged, with n=1, 2, 3, 4, 8, and
wherein the reference head and the n-th order error component detection heads, n=2, 4, are disposed on one track of the plurality of tracks, and the n-th order error component detection heads, n=1, 3, 8, are disposed on another track of the plurality of tracks.

* * * * *